Aug. 4, 1936.  S. SMITH  2,050,070
VEHICLE BODY AND DOOR THEREFOR
Original Filed Oct. 12, 1933
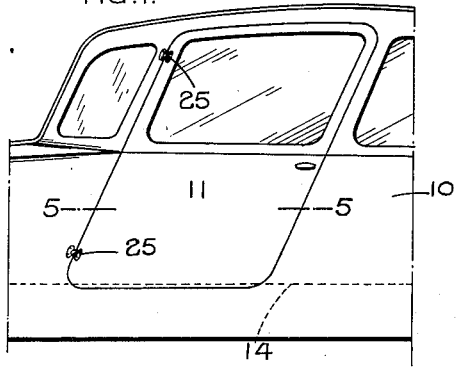
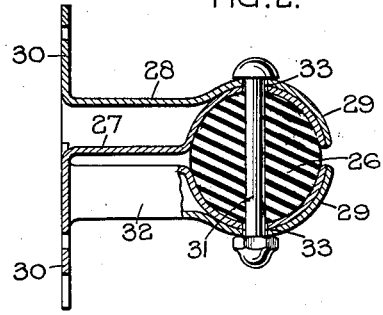
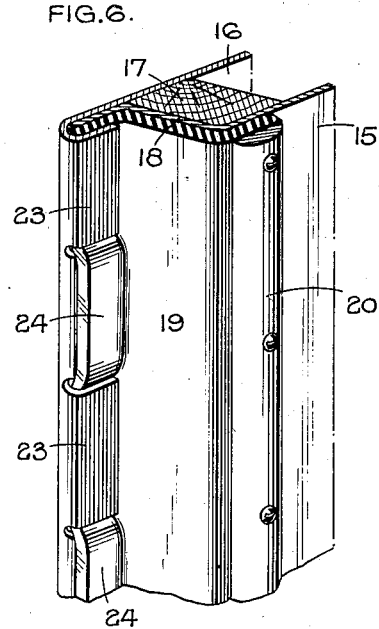
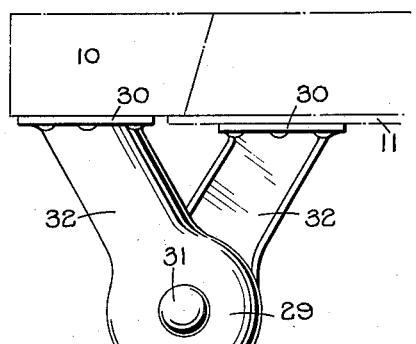
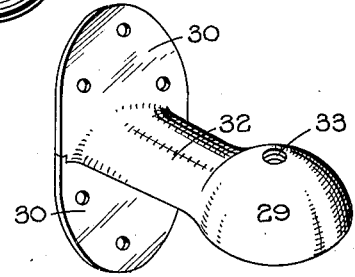
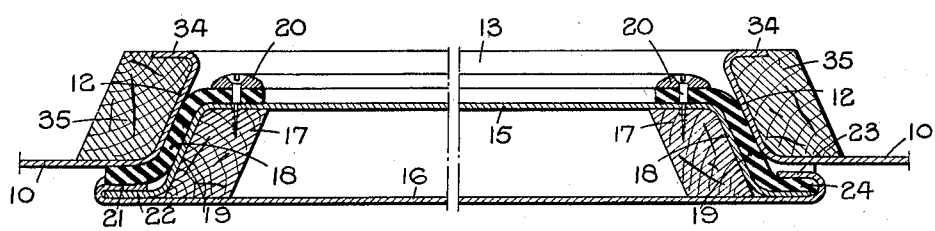
INVENTOR:
SYDNEY SMITH
BY: Francis E. Boyce
ATTORNEY Patented Aug. 4, 1936

2,050,070

UNITED STATES PATENT OFFICE 2,050,070

VEHICLE BODY AND DOOR THEREFOR

Sydney Smith, Chobham, England

Original application October 12, 1933, Serial No. 693,290. Divided and this application March 16, 1934, Serial No. 715,858. In Great Britain October 14, 1932

4 Claims. (Cl. 296—44)

This invention relates to improvements in vehicles, particularly automobile vehicles of the saloon type, being a division of application Serial No. 693,290 filed October 12, 1933.

The primary object of the invention is to provide an improved door construction enabling the/or each door of the vehicle to centre itself in the door opening and fit into the opening with a wedging action, thereby stiffening and strengthening the body at the position at which it is weakened by the door opening.

A further object is to provide a weather proof and draught proof construction and to reduce or eliminate door rattle.

Referring to the drawing:—

Figure 1 shows part of a vehicle having a door constructed according to the present invention.

Figure 2 is a vertical section through one of the door hinges.

Figure 3 is a plan view of same.

Figure 4 is a detail showing one portion of the hinge.

Figure 5 is a section on line 5—5 of Figure 1.

Figure 6 shows in perspective a portion of the door.

At each side of the body 10 of the vehicle there is provided a door 11 and at the door opening the metal of the body shell is flanged inwardly at 12 to form the seat for the edges of the door.

The principle is the same if there are two doors per side.

At the lower edge of the door opening the flange 13 bridges the gap between the side wall of the body shell and a spaced sheet metal reinforcement member 14, over the upper edge of which latter the flange 13 is turned.

The flanges 12 at opposite sides of each door opening are of mutually converging section, and the door which is formed from inner and outer panels 15 and 16 with wooden spacers 17, is of corresponding form in both horizontal and vertical sections.

The door 11 is thus of shallow truncated pyramidal form with opposite edges mutually inclined or converging.

When moved into the door opening, the door 11 seats upon the flanges 12 and 13 with a wedging action and the door thus strengthens and stiffens the body by providing additional strength or support at the door opening at which the body is comparatively weak.

The inclined edges 18 of the door are made resilient by a lining of strips 19 of felt, rubber or the like, secured along one edge beneath beading 20.

The panels 15 and 16 are connected by flanging or turning the edge 21 of the outer panel 16 over the flange 22 on the inner dished panel 15, and whilst parts of the edge 21 are pressed firmly on to the flange 22 to connect the panels rigidly together, as on the left hand side of Figure 6, further tongues 23 are spaced from the surface of the flange 22, as shown on the right hand side of Figure 6.

The outer longitudinal edge 24 of the strips 19 are secured beneath the tongues 23 and the strips 19 can readily be removed and renewed by removing the beading 20 and pulling the strips from beneath the tongues 23.

The doors shown are of the leaning type, and each door is hinged at its forward inclined side.

In order that the door shall be self-centering in the door opening the hinges 25 each comprises two attachment brackets between which is disposed a resilient rubber ball 26.

Each attachment bracket comprises two sheet metal pressings 27 and 28 each formed at one end with a part spherical cup 29, and at the other end with an attachment flange 30. The two pressings are welded together, so that the cups 29 on the two pressings rest one within the other and with the flanges 30 extending in opposite directions as shown in Figure 4. The cups 29 and the attachment flanges 30 are connected by an arm 32 of hollow form providing a strong and rigid construction.

When each hinge is mounted in position with one attachment bracket secured to the door and the other bracket to the body shell 10 adjacent the door opening, the opposed cups 29, with the ball 30 disposed therein, are connected by a bolt 31.

The bolt 31 passes through clearance holes 33 in the cups 29, and the door, whilst normally held steadily, is capable of sufficient movement in any direction to centre itself in the door opening.

The hinges allow any necessary movement required for the door to centre itself and wedge into the door opening and in addition allow the door to engage the strips 19 entirely around the door opening so that there are no gaps at any side of the door.

The insertion therefor provides an extremely weather proof and draught proof construction and the combination of the resilient hinges, the strips 19 and the wedge-like fitting between the door and the door opening, reduces or eliminates rattle or squeaking of the door in the opening, or of the hinges.

The flanges 12 are overturned at 34 on the interior of the body to form channels at the sides and top of the door opening, and a filling strip 35 of wood, felt, or other suitable packing material is secured in such channel. The strips 35 serve for the attachment of fittings or accessories, and in addition reinforce the body and reduce the possibility of drumming of the body shell.

The particular form of resilient hinge herein illustrated and applied is particularly advantageous in the preferred construction illustrated, since this form of hinge is resilient in a direction transverse to the axis of the hinge in addition to being resilient in an axial direction and the hinge will thus allow the door to move either parallel to or transversely of the hinging axis to centre itself in the door opening.

This form of hinge per se forms no part of the present invention, however, but is covered by my co-pending application serially numbered 755,898.

What I claim then is:—

1. A vehicle including in combination a body shell having a door opening, a door for said door opening, inwardly directed flanges on said body shell at the edges of said opening to form a seat for said door, said flanges at opposite sides of said door opening extending towards the interior of said body in mutually converging relationship, said door being of shallow truncated pyramidal form to seat upon said flanges, a strip of resilient material around the edges of said door, a projecting flange around the peripheral edge of said door, said strip seating between said projecting flange and the side of said body shell and in addition seating between the inwardly directed flanges on said body shell and the edges of said door, inner and outer panels for said door, beading attaching said strip at one longitudinal edge to said inner panel, tongues on said outer panel engaging said strip at the other longitudinal edge, and resilient hinges for attaching said door to said body, to allow the door to centre itself in the opening and seat therein with a wedging action to stiffen and strengthen the body shell at the door opening.

2. A vehicle including in combination a body shell having a door opening, a door for said door opening, inwardly directed flanges on said body shell at the edges of said opening to form a seat for said door, said flanges at opposite sides of said door opening extending towards the interior of said body in mutually converging relationship, said door being of shallow truncated pyramidal form to seat upon said flanges, a strip of resilient material around the edges of said door, means for securing said strip to said door, a projecting flange around the peripheral edge of said door, said strip seating between said projecting flange and the side of said body shell and in addition seating between the inwardly directed flanges on said body shell and the edges of said door.

3. A vehicle including in combination a body shell having a door opening, a door for said door opening, inwardly directed flanges on said body shell at the edges of said opening to form a seat for said door, said flanges at opposite sides of said door opening extending towards the interior of said body in mutually converging relationship, said door being of shallow truncated pyramidal form to seat upon said flanges, a strip of resilient material around the edges of said door, means for securing said strip to said door, a projecting flange around the peripheral edge of said door, said strip seating between said projecting flange and the side of said body shell and in addition seating between the inwardly directed flanges on said body shell and the edges of said door, and resilient hinges for attaching said door to said body, each of said hinges being resilient in a direction transverse to the axis thereof and also in an axial direction to allow the door to seat into the opening with a wedging action.

4. A vehicle including in combination a body shell having a door opening, a door for said door opening, inwardly directed flanges on said body shell at the edges of said opening to form a seat for said door, said flanges at opposite sides of said door opening extending towards the interior of said body in mutually converging relationship, said door being of shallow truncated pyramidal form to seat upon said flanges, a strip of resilient material around the edges of said door, a projecting flange around the peripheral edge of said door, said strip seating between said projecting flange and the side of said body shell and in addition seating between the inwardly directed flanges on said body shell and the edges of said door, inner and outer panels for said door, beading attaching said strip at one longitudinal edge to said inner panel, tongues on said outer panel engaging said strip at the other longitudinal edge, and resilient hinges for attaching said door to said body, each of said hinges being resilient in a direction transverse to the axis thereof and also in an axial direction to allow the door to seat into the opening with a wedging action.

SYDNEY SMITH.